July 7, 1931.  A. Y. DODGE  1,813,444

BRAKE MECHANISM

Filed Nov. 7, 1927

INVENTOR
Adiel Y. Dodge
BY
Burton & McConkey
ATTORNEYS.

Patented July 7, 1931

1,813,444

UNITED STATES PATENT OFFICE

ADIEL Y. DODGE, OF SOUTH BEND, INDIANA, ASSIGNOR TO BENDIX BRAKE COMPANY, OF CHICAGO, ILLINOIS, A CORPORATION OF ILLINOIS

BRAKE MECHANISM

Application filed November 7, 1927. Serial No. 231,452.

My invention relates to brake mechanism and is here shown as embodied in a brake structure suitable for use on an automobile road wheel.

An object is to provide a brake with an improved adjustment for the relatively movable anchor supports of the retarding mechanism. A further object lies in the employment of an improved connection between the relatively movable anchor pins, which connection is readily operable to move the anchors with respect to each other; for example, to draw them together to tighten the brake. A meritorious feature consists in the provision of a supporting connection between the anchor pins which is adjustable to carry the anchors toward or away from each other. The connection illustrated is relatively extensible, being shown as consisting of a plurality of relatively slidable members, preferably spaced overlapping laminations, operable to be actuated to move the anchor pins.

Several other meritorious features of my invention will appear in the following description of the illustrative embodiment shown in the accompanying drawings and from the appended claims.

Figure 1:
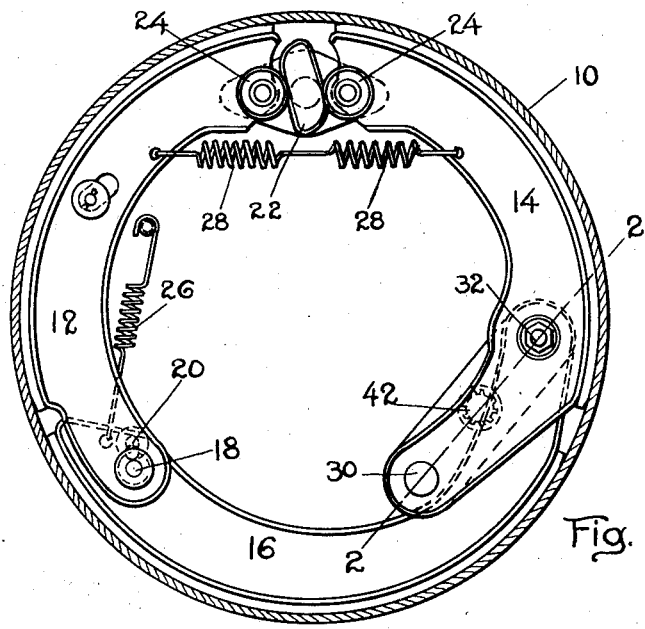
Fig. 1 is a side elevation of a brake embodying my invention.

Let 10 indicate a brake drum shown in section in Fig. 1 within which is mounted a three shoe brake mechanism comprising primary, secondary and auxiliary shoes 12, 14 and 16, respectively. Shoes 12 and 16 are connected by an articulating pin 18 and an adjustable eccentric 20 is shown as provided to adjust the position thereof. An operating cam 22 is shown as positioned between the separated ends of the shoes 14 and 12, which cam engages bearing rollers 24 carried by such shoes to spread the shoes apart against the drum. Springs 26 and 28 are provided to hold the shoes normally away from the drum.

Figure 2:
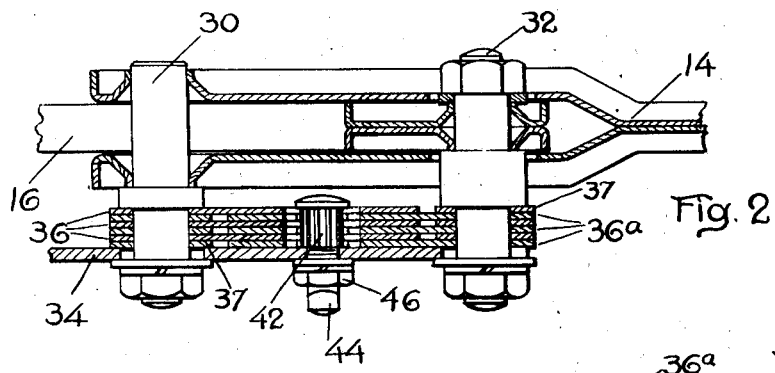
Fig. 2 is a sectional view taken on line 2—2 of Fig. 1.
Figures 3, 4, 5:
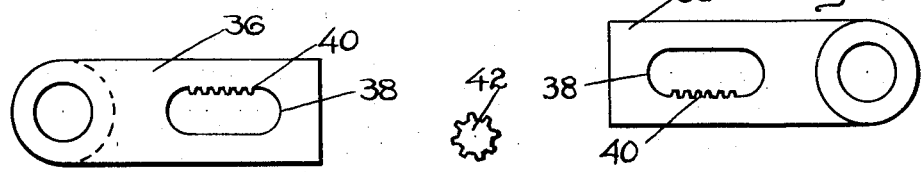
Figs. 3, 4 and 5, are side elevations respectively of the overlapping laminations and of a section through a pinion adapted to engage such laminations.

The shoes 14 and 16 have overlapping ends pivotally mounted upon anchor pins 30 and 32, which extend through enlarged apertures in the backing plate 34. The shoe 16 is mounted upon the anchor pin 32 and the shoe 14 is mounted upon the anchor pin 30 and my invention resides in improved mechanism for adjusting the positions of these anchor pins which consists in a reinforcing plate illustrated in Fig. 2 comprising a plurality of interleaved laminations. The laminations carried by the anchor pin 30, three in number, are indicated as 36 and the laminations carried by the anchor pin 32 are indicated as 36—a. Suitable spacers are provided indicated as 37. These laminations have normally registering openings 38 which are provided with rack teeth 40 on their respectively opposite sides. An adjusting pinion 42 extends through the openings 38 in these laminations and engages the rack teeth thereof as shown in Fig. 2. This pinion is mounted in the backing plate and has an exteriorly projecting portion 44 which may be engaged by a wrench for adjustment and carries a lock nut 46 to hold it in adjusted positions.

It will be seen that through rotation of the pinion the separate laminations are actuated slidably over each other to spread the anchor pins apart or to draw them more closely together to loosen or tighten the brake. It is furthermore apparent that this connection for adjusting the position of the anchor pins serves as a reinforcing plate or support therefor.

What I claim is:

1. Brake mechanism including a drum, brake shoes arranged within the drum having overlapping ends supported upon anchor pins, an adjustable connection between the pins operable to positively move them relatively toward or away from each other.

2. Brake mechanism having a pair of anchors carried by a connection consisting of relatively slidable overlapping plates relatively slidably adjustable to move the anchors toward or away from each other.

3. Brake mechanism having a pair of anchors connected by relatively slidably overlapping plates and means engaged therewith to relatively slidably adjust said plates to move the anchors toward or away from each other.

4. Brake mechanism having a pair of anchors carried by a connecting plate consisting of relatively movable laminations and means coupled therewith to actuate the laminations to actuate the anchors with respect to each other.

5. Brake mechanism having a pair of anchors carried by a connecting plate consisting of relatively longitudinally slidable laminations and means operable to actuate said laminations in opposite directions to move the anchors with respect to each other.

6. A brake having a backing plate, a pair of shoes arranged upon anchors extending through the plate, an adjustable connection consisting of overlapping members engaging said anchors and means extending through the plate operable to actuate said connection to draw the anchors together.

7. Brake mechanism including retarding means and a pair of anchor supports therefor and a connection consisting of interleaved relatively frictionally slidable laminations between said anchors and means engaging the laminations to move the anchors with respect to each other.

8. A brake having retarding means, a pair of anchor pivots for the retarding means, a plurality of interleaved plates carrying and connecting said anchors and a pinion engaging said plates to actuate them to move the anchors with respect to each other.

9. Brake mechanism including a drum, a backing plate, brake shoes arranged within the drum and having overlapping ends, anchors extending through the backing plate and upon which the overlapping ends of the brake shoes are mounted, an extensible connection joining and supporting said anchors and means extending through the backing plate operable to actuate said connection to draw the anchors together.

10. Brake mechanism including a drum, a backing plate, brake shoes arranged within the drum and having overlapping ends, an extensible reinforcement arranged within the drum alongside the backing plate connecting the overlapping ends of the shoes, anchors for the ends of said shoes carried by the ends of said reinforcement and means operable to vary the extension of said reinforcement to draw the ends of said shoes toward each other.

11. Brake mechanism including a drum, a backing plate, brake shoes arranged within the drum and having overlapping ends, an anchor support consisting of interleaved relatively frictionally slidable laminations bridging the space between the overlapped ends of the shoes, a pair of anchors for said shoes carried by said support one at each end thereof and means engaging the several laminations of the support operable to move them to vary the distance between said anchors.

12. Brake mechanism including a drum, a backing plate, brake shoes arranged within the drum and having overlapping ends, an anchor support comprising a pair of overlapping slidably arranged plates disposed within the drum alongside the backing plate between the ends of the shoes, a pair of anchors for said shoes one carried by each plate, and means engaging the plates to slidably adjust them to vary the distance between said anchors.

13. Brake mechanism including a drum, a backing plate, brake shoes arranged within the drum and having overlapping ends, an anchor support comprising a pair of overlapping slidably arranged plates disposed within the drum alongside the backing plate between the ends of the shoes, a pair of anchors for said shoes one carried by each plate, and means extending through the backing plates engaging said plates operable to move them to draw the anchors toward each other.

14. Brake mechanism comprising a drum, a backing plate having oversize anchor pin openings, a pair of shoes arranged within the drum, an extensible anchor support arranged within the drum alongside the backing plate extending between and bridging the oversize anchor pin openings, anchors for said shoes carried by the opposite ends of said support extending through the oversize openings in the backing plate, and means extending through the backing plate engaging said support operable to vary the extension thereof to change the distance between the anchors carried thereby.

15. Brake mechanism comprising a drum, a backing plate having oversize anchor pin openings, a pair of shoes arranged within the drum, an anchor support consisting of a plurality of overlapped relatively slidably arranged plates disposed within the drum alongside the backing plate extending between and bridging the oversize anchor pin openings through the backing plate, anchor pins for the shoes carried by said plates extending through the oversize openings in the backing plate holding said overlapping supporting plates toward the backing plate and means operable to vary the slidable overlapping relationship of said anchor plates to change the distance between said anchor pins.

In testimony whereof, I, ADIEL Y. DODGE, sign this specification.

ADIEL Y. DODGE.